US011333231B2

(12) United States Patent
Nagaoka et al.

(10) Patent No.: US 11,333,231 B2
(45) Date of Patent: May 17, 2022

(54) DRIVE CONTROL APPARATUS

(71) Applicant: GKN Automotive Limited, Birmingham (GB)

(72) Inventors: Takahiro Nagaoka, Tochigi (JP); Ryuya Saitoh, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/329,284

(22) Filed: May 25, 2021

(65) Prior Publication Data

US 2021/0388889 A1    Dec. 16, 2021

(30) Foreign Application Priority Data

Jun. 12, 2020   (JP) .............................. JP2020-102470

(51) Int. Cl.
*F16H 48/22*   (2006.01)
*B60K 17/35*   (2006.01)
*F16H 48/20*   (2012.01)
*F16H 48/24*   (2006.01)

(52) U.S. Cl.
CPC ............. *F16H 48/22* (2013.01); *B60K 17/35* (2013.01); *F16H 2048/204* (2013.01)

(58) Field of Classification Search
CPC .... F16H 48/22; F16H 2048/204; F16H 48/24; B60K 17/35
See application file for complete search history.

(56) References Cited

U.S. PATENT DOCUMENTS

| 5,301,769 | A * | 4/1994 | Weiss | B60K 17/3462 180/249 |
| 2004/0030480 | A1* | 2/2004 | Kadota | B60K 28/16 701/70 |
| 2004/0040375 | A1* | 3/2004 | Kadota | B60L 15/20 73/115.02 |
| 2010/0250049 | A1* | 9/2010 | Nihei | B60W 10/14 701/31.4 |
| 2014/0067215 | A1* | 3/2014 | Wetterlund | E02F 9/2079 701/69 |
| 2016/0355089 | A1* | 12/2016 | Ogawa | B60K 23/08 |

FOREIGN PATENT DOCUMENTS

JP            2014-055663 A        3/2014

* cited by examiner

*Primary Examiner* — Tinh Dang
(74) *Attorney, Agent, or Firm* — Bejin Bieneman PLC

(57) ABSTRACT

A drive control apparatus includes a circuitry configured to operate a differential lock device of a differential device in timings which are different between a two wheel drive state and a four wheel drive state. The differential device is disposed between one of a pair of front wheels and a pair of rear wheels of the vehicle and configured to transmit a driving force from a drive source to the one of the pair of front wheels and the pair of rear wheels. The differential lock device is configured to lock a differential rotation of a pair of output members of the differential device that are differentially rotatable with respect to each other, and configured to respectively output the drive force.

8 Claims, 5 Drawing Sheets

DRIVE CONTROL APPARATUS

CROSS-REFERENCE TO RELATED APPLICATIONS

This application is based on and claims priority under 35 USC 119 from Japanese Patent Application No. 2020-102470 filed on Jun. 12, 2020, the contents of which are incorporated herein by reference in its entirety.

BACKGROUND ART

A vehicle typically includes at least a pair of front wheels and a pair of rear wheels. A differential device is disposed between at least the pair of front wheels or the pair of rear wheels. A pair of wheels are driven and rotated via the differential device using a drive source.

The differential device in such a vehicle may include a differential case, a pinion, side gears, and a differential lock device. The differential case serves as an input member to which a drive force is input and that is rotatably disposed. The pinion serves as a differential member that is rotatably supported by the differential case and revolves by a rotation of the differential case. The side gears serves as a pair of output members that engage with the pinion. The side gears can be rotated relative to each other. Each of the side gears can output a drive force. The differential lock device can lock differential rotations between the pair of side gears.

JP2014055663A discloses a drive control apparatus that controls driving of a vehicle on which such a differential device is mounted. The drive control apparatus includes a determination unit serving as a control device that executes a control with an automatic mode in which locking of a differential lock device can be automatically switched between ON and OFF.

In the drive control apparatus, in the automatic mode of the determination unit, when a differential rotation between the pair of wheels is equal to or larger than a predetermined rotation difference, the determination unit operates the differential lock device to lock the differential rotation between the pair of side gears.

When the differential rotation of the pair of side gears is locked in this manner, there is no differential rotation between the pair of wheels. Accordingly, one side wheel can be prevented from slipping, and running performance on a rough road can be improved.

In the drive control apparatus of JP2014055663A, for example, when a vehicle speed is equal to or lower than a predetermined speed in a four wheel drive state of the vehicle, an operation of the differential lock device is controlled in the automatic mode.

In the drive control apparatus of JP2014055663A, an operation of the differential lock device cannot be controlled in the automatic mode in a two wheel drive state, and a drive force when the vehicle travels cannot be sufficiently exhibited.

SUMMARY

The present disclosure relates to a drive control apparatus applied to a vehicle. The drive control apparatus can accurately control an operation of a differential lock device in an automatic mode in accordance with a drive mode of a vehicle such as a four wheel drive state or a two wheel drive state.

A drive control apparatus includes a circuitry configured to operate a differential lock device of a differential device in timings which are different between a two wheel drive state and a four wheel drive state. The differential device is disposed between one of a pair of front wheels and a pair of rear wheels of the vehicle and configured to transmit a driving force from a drive source to the one of the pair of front wheels and the pair of rear wheels. The differential device includes an input member, a differential member, a pair of output members, and the differential lock device. The input member is rotatably disposed and to which the drive force is input. The differential member is rotatably supported on the input member and capable of revolving by a rotation of the input member. The pair of output members respectively engage with the differential member. The pair of output members are differentially rotatable with respect to each other. The pair of output members are configured to respectively output the drive force. The differential lock device is configured to lock a differential rotation of the pair of output members. The one of the pair of front wheels and the pair of rear wheels is driven in the two wheel drive state, and both of the pair of front wheels and the pair of rear wheels are driven in the four wheel drive state.

According to the drive control apparatus, in an automatic mode of a control device, a control unit can accurately control an operation of the differential lock device and sufficiently exhibit the drive force in accordance with a vehicle traveling drive mode by automatically switching different timings of turning on and turning off locking of the differential lock device between a two wheel drive state and a four wheel drive state of the vehicle.

In this manner, since switching timings of turning on and turning off locking of the differential lock device are set to be different in accordance with drive modes of the vehicle, the running performance of the vehicle in different drive modes can be improved.

Therefore, in the drive control apparatus, since the control unit has the first and second switching timings that are different switching timings for the automatic mode between the two wheel drive state and the four wheel drive state of the vehicle, an operation of the differential lock device can be accurately controlled in the automatic mode in accordance with a drive mode of the vehicle such as the four wheel drive state and the two wheel drive state.

The drive control apparatus of the present disclosure would accurately control an operation of a differential lock device in an automatic mode in accordance with a drive mode of a vehicle such as a four wheel drive state and a two wheel drive state.

DESCRIPTION OF EMBODIMENTS

Figure 1:
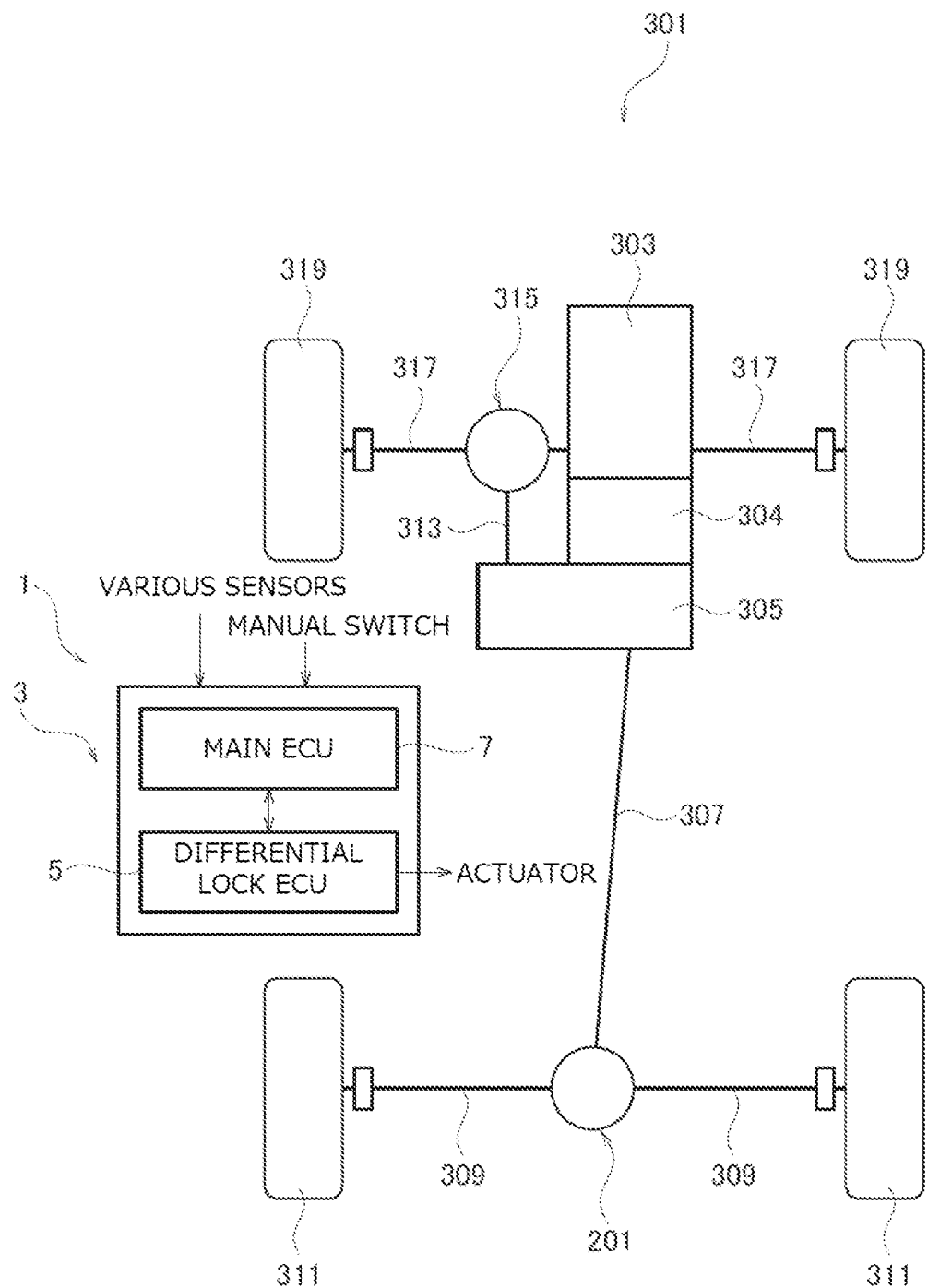
FIG. 1 is a schematic diagram showing an example of a power system of a vehicle to which a drive control apparatus according to a first embodiment applied.

A drive control apparatus according to embodiments will be described with reference to FIGS. 1 to 5.

First Embodiment

A first embodiment will be described with reference to FIGS. 1 to 4.

A drive control apparatus 1 according to the first embodiment is used in a vehicle 301 that has at least a pair of front wheels and a pair of rear wheels. In the vehicle 301, a differential device 315 is disposed between at least a pair of front wheels 319 and 319, or a differential device 201 is disposed between the pair of rear wheels 311 and 311. A drive source 303 drives and rotates the pair of wheels via the differential device 201. First, a case in which the drive control apparatus is applied to a side of the differential device 201 will be described in the present embodiment.

The differential device 201 includes a differential case 203, a pinion 205, side gears 207 and 209, and a differential lock device 211. The differential case 203 serves as an input member to which a drive force is input. The differential case 203 is rotatably disposed. The pinion 205 serves as a differential member that is rotatably supported in the differential case 203. The pinion 205 revolves by a rotation of the differential case 203. The side gears 207 and 209 serve as a pair of output members that engage with the pinion 205. The side gears 207 and 209 can be rotated relative to each other. Each of the side gears 207 and 209 can output a drive force. The differential lock device 211 can lock a differential rotation of the pair of side gears 207 and 209.

The drive control apparatus 1 includes a circuitry that controls driving of the vehicle 301 and includes a control device 3 that executes a control with an automatic mode in which ON and OFF of locking of the differential lock device 211 can be automatically switched.

The control device 3 includes a differential lock ECU 5 serving as a control unit having first and second switching timings that are different switching timings for the automatic mode between a two wheel drive state in which at least one of the front and rear wheels of the vehicle 301 is driven and a four wheel drive state in which both the front and rear wheels of the vehicle 301 are driven.

The four wheel drive state in which both of the front and rear wheels of the vehicle 301 are driven can be switched to a second four wheel drive state in which a drive torque can be further increased. The differential lock ECU 5 has a third switching timing corresponding to the second four wheel drive state.

The differential device 201 further includes a differential limiting device 213 that can limit a differential under a self-control of the differential limiting device 213. The differential lock ECU 5 can adjust a switching timing to another switching timing when the differential device 201 includes the differential limiting device 213.

First, an example of a power system of a vehicle to which a drive control apparatus according to the embodiment is applied will be described with reference to FIG. 1.

As shown in FIG. 1, a power system of the vehicle 301 includes the drive source 303 such as an internal combustion engine or an electric motor, a transfer 305 that transmits a drive force from the drive source 303 to a front wheel side and a rear wheel side via a transmission 304, a rear wheel side propeller shaft 307, the first differential device 201 that is a rear differential device for allowing a differential rotation between left and right wheels at a rear wheel side, rear axles 309 and 309, the rear wheels 311 and 311, a front wheel side propeller shaft 313, the second differential device 315 that is a front differential device for allowing a differential rotation between left and right wheels at a front wheel side, front axles 317 and 317, the front wheels 319 and 319, and the like.

In the power system of the vehicle 301, the drive force from the drive source 303 is transmitted to the transfer 305, is constantly transmitted to the differential device 201 via the rear wheel side propeller shaft 307, and is distributed to the rear wheels 311 and 311 via the rear axles 309 and 309.

On the other hand, when the drive force is transmitted to the transfer 305 in a state in which a clutch (not shown) provided in the transfer 305 is connected, a part of the drive force from the drive source 303 is transmitted to the differential device 315 via the front wheel side propeller shaft 313. When the drive force is transmitted in a state in which an interrupting mechanism (not shown) (generally referred to as an axle disconnect, a free running, or the like) provided in the differential device 315 is connected, the drive force is distributed to the front wheels 319 and 319 via the front axles 317 and 317, and the vehicle 301 enters a four wheel drive state in which the front and rear wheels are driven.

On the other hand, when the interrupting mechanism applied to the differential mechanism 315 is in a disconnected state, a power transmission from the front wheel side propeller shaft 313 to the front differential 315 is cut off, the drive force is not transmitted to the front wheels 319 and 319, and the vehicle 301 enters a two wheel drive state in which the rear wheels are driven.

The transfer 305 includes a Hi-Low switching gear mechanism that can switch from a first four wheel drive state during normal traveling to the second four wheel drive state in which a drive torque can be increased. A driver can manually select the Hi-Low switching gear mechanism or the differential lock ECU can automatically select the Hi-Low switching gear mechanism by detecting a traveling state of the vehicle.

Although the power system of the vehicle 301 is an FR-based vehicle (Front-engine Rear-drive based vehicle) in which the drive force is mainly transmitted to the rear wheel side, the present invention is not limited thereto. The drive control apparatus can be applied to an FF-based vehicle (Front-engine Front-drive based vehicle) in which the drive force is mainly transmitted to the front wheel side.

In this case, the drive force from the drive source 303 is constantly transmitted to the first differential device 315 which is a front differential, and the vehicle enters a two wheel drive state in which front wheels are driven. When the interrupting mechanism applied to a rear differential device is in a connected state, the second differential device 201 which is a rear differential device is driven, and the vehicle enters a four wheel drive state in which front and rear wheels are driven. When the interrupting mechanism is in a disconnected state, the vehicle returns to a two wheel drive state in which front wheels are driven.

Transmission of the drive force to a side of the differential device 315 in the FR-based vehicle or to a side of the differential device 201 in the FF-based vehicle may be cut off by disconnection of the interrupting mechanism only that cuts off transmission of the drive force applied to the transfer 305.

Next, the differential device 201 that is mounted in the vehicle 301 and is operated under the control of the drive control apparatus will be described with reference to FIG. 2.

Figure 2:
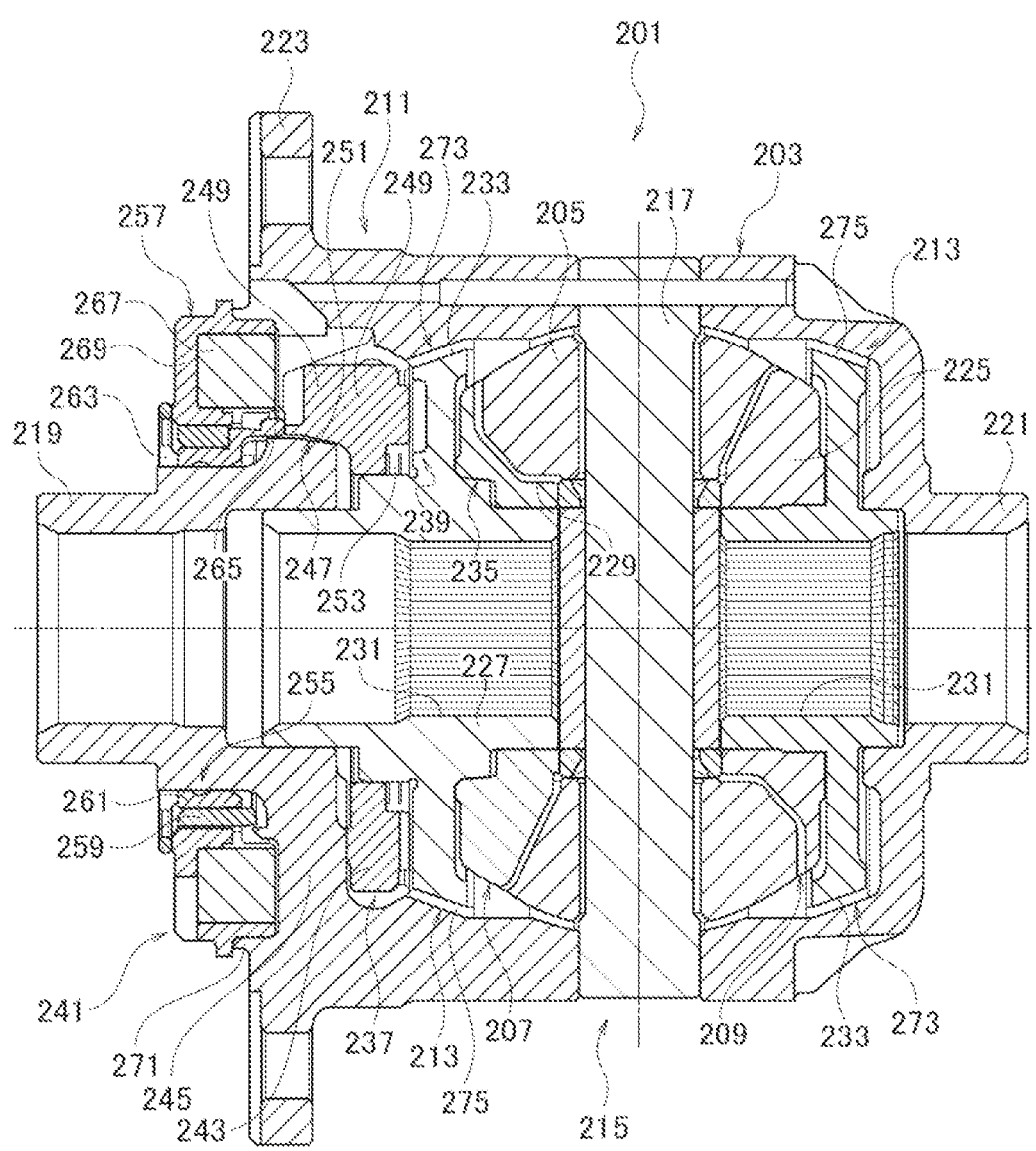
FIG. 2 is a cross-sectional view showing an example of a differential device to which the drive control apparatus according to the first embodiment is applied.

As shown in FIG. 2, the differential device 201 includes a differential mechanism 215, the differential lock device 211, and the differential limiting device 213.

The differential mechanism 215 includes the differential case 203, a pinion shaft 217, the pinion 205, and the pair of side gears 207 and 209.

The differential case 203 is rotatably supported by stationary members (not shown) such as carriers via bearings (not shown) on outer peripheries of boss portions 219 and 221 formed at both sides of the differential case 203 in an axial direction.

A flange portion 223 to which a ring gear (not shown) is fixed is formed in the differential case 203.

The ring gear fixed to the flange portion 223 engages with, for example, a power transmission gear (not shown) provided in a manner of integrally rotatable with the rear wheel side propeller shaft 307 (see FIG. 1) that transmits a drive force from the drive source 303 (see FIG. 1), and the drive force is input to rotationally drive the differential case 203.

The differential case 203 accommodates the pinion shaft 217, the pinion 205, the pair of side gears 207 and 209, and the like.

Two end portions of the pinion shaft 217 engage with hole portions formed in the differential case 203, and one end portion of the pinion shaft 217 is prevented from coming off by a pin and is rotationally driven integrally with the differential case 203.

The pinions 205 are respectively supported at two end sides of the pinion shaft 217.

A plurality of (here, two) pinions 205 are arranged at equal intervals in a circumferential direction of the differential case 203, and each of the pinions 205 is supported at an end portion side of the pinion shaft 217 and revolves by a rotation of the differential case 203.

The pinion 205 is rotatably supported by the pinion shaft 217 in a manner of being rotationally driven when a differential rotation occurs between the pair of side gears 207 and 209 that engage with the pinion 205.

The pinion 205 transmits a drive force input to the differential case 203 to the pair of side gears 207 and 209.

The pair of side gears 207 and 209 are accommodated in the differential case 203 in a manner of differentially rotatable to each other. Each of the side gears 207 and 209 includes a first output member 225 and a second output member 227.

The first output member 225 is formed into an annular shape, and a gear portion 229 that engages with a gear portion of the pinion 205 is formed at an outer peripheral side of the first output member 225.

The second output member 227 is formed into an annular shape having a recessed accommodating portion that can accommodate the first output member 225 in a manner of being close to the first output member 225 in an axial direction.

An output portion 231 that outputs a drive force transmitted to the pair of side gears 207 and 209 is provided at an inner peripheral side of the second output member 227.

A sliding portion 233 that slides on a tapered ring 273 of the differential limiting device 213 is provided at an outer peripheral side of the second output member 227.

A cam portion 235 is provided between the second output member 227 and the first output member 225, and the second output member 227 and the first output member 225 are coupled to each other so as to be integrally rotatable with each other.

The cam portion 235 has a plurality of recessed and protruding portions provided at the inner peripheral side of the first output member 225 and having engagement surfaces inclined forward and backward in a rotation direction, and a plurality of recessed and protruding portions provided at an outer peripheral side of the output portion 231 of the second output member 227 and having engagement surfaces inclined forward and backward in the rotation direction.

Of the cam portion 235, the plurality of recessed and protruding portions of the first output member 225 and the plurality of recessed and protruding portions of the second output member 227 engage with one another in the rotation direction, so that the recessed and protruding portions that are coupled to one another can cause the first output member 225 and the second output member 227 to rotate integrally.

Engagement surfaces of the plurality of recessed and protruding portions in the rotation direction of the cam portion 235 are inclined at a predetermined angle and are formed as cam surfaces that come into contact with one another. Alternatively, a form of the cam surfaces may have other shapes as appropriate as long as the cam portion 235 has a structure in which the plurality of recessed and protruding portions are coupled to one another in a rotation direction and a thrust force is generated in a rotation axis direction.

The cam surfaces of the cam portion 235 cause the second output members 227 and 227 to move axially outward by a cam thrust force via the first output members 225 and 225 by using a drive force transmitted from the gear portion of the pinion 205 by the rotation of the pair of side gears 207 and 209.

The second output members 227 and 227 are moved in an axial direction, sliding between the sliding portions 233 and 233 of the pair of side gears 207 and 209 and the tapered rings 273 and 273 can be enhanced, and a differential limiting force of the differential limiting device 213 can be increased.

For example, drive shafts coupled to the rear axles 309 and 309 (see FIG. 1) are coupled to the output portions 231 and 231 of the pair of side gears 207 and 209 so as to be integrally rotatable with each other, and a drive force input to the differential case 203 is distributed and output from the pair of side gears 207 and 209 to the rear wheels 311 and 311 (see FIG. 1).

A differential operation of the differential mechanism 215 is interrupted by the differential lock device 211.

The differential lock device 211 includes a clutch member 237, an interrupting portion 239, and an actuator 241.

The clutch member 237 is formed into an annular shape, and a base portion 243 formed of a single member continuous in a circumferential direction of the clutch member 237 is disposed between a wall portion 245 of the differential case 203 and a rear surface side of the gear portion 229 of the side gear 207 in an axial direction so as to be movable in the axial direction.

An engagement portion 247 that engages with the differential case 203 so as to be rotatable integrally with the differential case 203 is provided at a side of the clutch member 237 close to the wall portion 245 of the differential case 203, and the interrupting portion 239 is provided between the clutch member 237 and a rear surface side the gear portion 229 of the side gear 207.

The engagement portion 247 has a plurality of protruding portions 249 provided on the base portion 243 of the clutch member 237 at equal intervals in a circumferential direction, and a plurality of holes 251 provided in the wall portion 245 of the differential case 203 at equal intervals in the circumferential direction so as to pass through the wall portion 245 in the axial direction.

When the protruding portions 249 and the holes 251 engage with one another in a rotation direction, the clutch member 237 is prevented from rotating relative to the differential case 203, and the clutch member 237 and the differential case 203 can be integrally rotated.

Cam surfaces having the same inclination are respectively formed on facing surfaces at both sides in the circumferential direction of the protruding portions 249 and the holes 251 of the engagement portion 247.

The cam surfaces engage with one another by a rotation of the differential case 203 when the clutch member 237 is moved in a connection direction of the interrupting portion 239 and an engagement action occurs in the interrupting portion 239 in the rotation direction.

The cam surfaces engage with one another, so that the clutch member 237 is further moved in an engagement direction of the interrupting portion 239, and the connection of the interrupting portion 239 is enhanced.

The interrupting portion 239 is provided between the clutch member 237 and a rear surface side of the gear portion 229 of the side gear 207 in the axial direction on a side surface of the base portion 243 of the clutch member 237 opposite to the engagement portion 247 in the axial direction.

A plurality of interrupting portions 239 are formed in a circumferential direction on each of the clutch member 237 and the second output member 227 of the side gear 207, and serve as engagement teeth that engage with one another.

The engagement teeth of the interrupting portions 239 engage with one another, so that the clutch member 237 and the side gear 207 are connected to each other so as to be integrally rotatable, that is, the differential case 203 and the side gear 207 are connected to each other so as to be integrally rotatable, and the differential operation of the differential mechanism 215 is brought into a locked state.

In the locked state of the differential mechanism 215, a drive force input to the differential case 203 and transmitted to the pair of side gears 207 and 209 is evenly output to, for example, the left and right rear wheels 311 and 311 (see FIG. 1).

On the other hand, a biasing member 253 is disposed at a radially inner side of the interrupting portion 239 between the clutch member 237 and the rear surface side of the gear portion 229 of the side gear 207 in the axial direction.

The biasing member 253 constantly biases the clutch member 237 in a disconnection direction of the interrupting portion 239.

The biasing member 253 moves the clutch member 237 in the disconnection direction of the interrupting portion 239, the interrupting portion 239 is disconnected, and the differential of the differential mechanism 215 is brought into an unlocked state.

The disconnected state of the interrupting portion 239 is controlled by the actuator 241.

The actuator 241 includes a movable member 255 and an electromagnet 257.

The movable member 255 is disposed at an inner diameter side of the electromagnet 257 so as to be movable in the axial direction on an outer periphery of the boss portion 219 of the differential case 203. The movable member 255 includes an annular plunger 259 and a ring member 261.

The plunger 259 is formed of a magnetic material, and is disposed at the inner diameter side of the electromagnet 257 with an air gap that is a minute gap set to allow a magnetic flux to pass therethrough.

The ring member 261 is formed of a non-magnetic material, and is integrally fixed to an inner diameter side of the plunger 259. The ring member 261 prevents the magnetic flux from leaking from an inner peripheral side of the plunger 259 to the differential case 203 side.

The ring member 261 is disposed on an outer periphery of the boss portion 219 of the differential case 203 so as to be movable in the axial direction. The ring member 261 is restricted from moving axially outward by a restriction member 263 formed of a non-magnetic material and press-fitted and fixed to the outer periphery of the boss portion 219 of the differential case 203.

The ring member 261 is provided with a pressing portion 265 on an end surface of the ring member 261 at the clutch member 237 side in an axial direction, and the pressing portion 265 can come into contact with the protruding portion 249 of the clutch member 237.

When the movable member 255 is moved toward the clutch member 237 side by the electromagnet 257, the pressing portion 265 transmits a moving operation force in the axial direction to the clutch member 237, and presses the clutch member 237 in a connection direction of interrupting portion 239.

The electromagnet 257 is disposed adjacent to the wall portion 245 of the differential case 203 in the axial direction at an outer peripheral side of the boss portion 219 of the differential case 203.

The electromagnet 257 is prevented from rotating relative to a stationary member such as a carrier by a rotation preventing portion (not shown). The electromagnet 257 includes an electromagnetic coil 267 and a core 269.

The electromagnetic coil 267 is annularly wound by a predetermined number of turns and is molded using a resin.

A lead wire (not shown) drawn out to the outside is connected to the electromagnetic coil 267, and the electromagnetic coil 267 is electrically connected to the drive control apparatus 1 that controls energization through the lead wire.

The core 269 is formed of a magnetic material so that a magnetic field is generated by energization to the electromagnetic coil 267, and the core 269 has a predetermined magnetic path cross-sectional area.

The core 269 annularly covers inner and outer peripheral surfaces of the electromagnetic coil 267 and an end surface in the axial direction of the electromagnetic coil 267 positioned at an opposite side to the wall portion 245 of the differential case 203.

An extending portion 271 extending in the axial direction from the wall portion 245 of the differential case 203 is provided at an outer diameter side of the core 269, so as to cover a sliding contact surface through which a magnetic flux can pass.

An end surface in the axial direction of the extending portion 271 comes into contact with a protruding portion provided on the core 269 and protruding outward in the radial direction, so that the extending portion 271 is positioned inward in the axial direction of the electromagnet 257.

On the other hand, an end surface at an outer side in the axial direction of the core 269 is positioned toward an outer side in the axial direction of the electromagnet 257 together with the movable member 255 by the restriction member 263 that restricts the movable member 255 from moving to the outer side in the axial direction.

In the differential lock device 211, when a magnetic flux passes through the core 269, the plunger 259, and the wall portion 245 of the differential case 203 by exciting the electromagnet 257, a shortest magnetic flux loop is formed.

The plunger 259 is moved toward the clutch member 237, and the ring member 261 presses the clutch member 237 via the pressing portion 265, by effectively using the magnetic flux loop.

When the movable member 255 presses the clutch member 237, the clutch member 237 is moved in a connection direction of the interrupting portion 239 against a biasing force of the biasing member 253, and the interrupting portion 239 is connected.

When the interrupting portion 239 is connected, the side gear 207 and the clutch member 237 are connected to each other so as to be rotated integrally, the side gear 207 and the differential case 203 are connected to each other, and the differential mechanism 215 is brought into a locked state.

On the other hand, when the energization to the electromagnet 257 is stopped, the clutch member 237 is moved in a disconnection direction of the interrupting portion 239 by a biasing force of the biasing member 253, and the interrupting portion 239 is disconnected.

When the interrupting portion 239 is disconnected, the side gear 207 and the clutch member 237 can be rotated relative to each other, the side gear 207 and the differential case 203 can be rotated relative to each other, and the differential mechanism 215 is brought into an unlocked state.

The actuator may be configured to operate the clutch member to connect or disconnect the interrupting portion by using any method using the electromagnet as an operation source.

For example, a configuration using a fluid pressure cylinder and a piston, a configuration combining an electric motor, a deceleration mechanism, and a cam mechanism, or the like can be appropriately adopted as an operation source other than the electromagnet.

For example, the clutch member 237 is provided with a detection member (not shown) that is moved integrally with the clutch member 237 in the axial direction and that is disposed outside the differential case 203.

The detection member is fixed to a stationary member such as a carrier, and is disposed to face a position switch (not shown) electrically connected to the drive control apparatus 1.

The position switch detects an axial position of the detection member, and detects an axial position of the clutch member 237 that moves integrally with the detection member.

In this manner, the axial position of the clutch member 237 is detected by the position switch, so that it is possible to detect whether the interrupting portion 239 is in a connected state, and it is possible to detect whether the differential lock device 211 is in a locked state.

The position switch may be a contact sensor that is turned on or off when the position switch comes into contact with the detection member, or a non-contact sensor that detects a position of the detection member when the position switch comes close to the detection member but does not come into contact with the detection member, or the like.

The differential limiting device 213 includes a pair of tapered rings 273 and 273 disposed between the pair of side gears 207, 209 and the differential case 203.

The pair of tapered rings 273 and 273 respectively have annular portions 275 and 275, and are formed in a manner of being reduced in diameter at a predetermined angle from one end side in a rotation axis direction toward the other end side in the rotation axis direction.

An inner peripheral surface of the annular portion of the tapered ring 273 is provided with a sliding surface that slides with the sliding portions 233 formed at a predetermined angle on the side gears 207 and 209.

An outer peripheral surface of the annular portion 275 is in contact with a tapered surface formed at a predetermined angle on the differential case 203 in a manner in which the annular portion 275 cannot rotate relative to the differential case 203 and cannot move relative to the differential case 203.

The tapered ring 273 is provided with an engagement portion (not shown) that engages, in a rotational direction, with a hole portion (not shown) provided in the differential case 203 and used for accommodating a member. When the engagement portion engages with the hole portion, the tapered ring 273 can be rotated integrally with the differential case 203.

As described above, the annular portion 275 of the tapered ring 273 is held between the tapered surface of the differential case 203 and the sliding portions 233 of the side gears 207 and 209, and the tapered ring 273 is appropriately positioned in the rotation axis direction.

The tapered ring 273 restricts the differential of the differential mechanism 215 by sliding the annular portion 275 with the sliding portions 233 of the pair of side gears 207 and 209 that are moved in the axial direction by a reaction force generated due to engagement with the pinion 205 in accordance with a rotation state of the differential mechanism 215.

In this manner, the annular portion 275 of the tapered ring 273 and the sliding portions 233 of the pair of side gears 207 and 209 form a torque sensitive cone clutch that generates a friction torque in accordance with a magnitude of a drive torque input to the differential case 203.

In the differential device 201, when the differential lock device 211 is in an unlocked state (OFF state), the differential limiting device 213 generates a differential limiting force according to a rotation state of the differential mechanism 215 such as a state in which a slip occurs in one of the rear wheels 311 (see FIG. 1).

The differential limiting force is generated, so that the differential of the differential mechanism 215 can be limited, and running performance of the vehicle 301 (see FIG. 1) on a rough road can be improved.

In this manner, the differential device 201 has a differential limiting function implemented by the self-controlled differential limiting device 213 that generates a differential limiting force according to a state of the differential mechanism 215, and a differential locking function implemented by the differential lock device 211 that brings the differential mechanism 215 into a locked state by connecting the interrupting portion 239.

In the differential device 201, the drive control apparatus 1 controls switching between ON and OFF (locked state and unlocked state) of locking of the differential lock device 211.

As shown in FIGS. 1 to 4, the drive control apparatus 1 includes the control device 3 and the differential lock ECU 5 serving as a control unit, and the drive control apparatus 1 can communicate with a main ECU. A main ECU 7 controls the drive source 303 and the transmission 304 of the vehicle, and controls other states of the vehicle. The differential lock ECU 5 may not be provided as a single ECU, and may execute a control in cooperation with the main ECU 7 or may be integrated with the main ECU 7.

The differential lock ECU 5 and the main ECU 7 can receive information from various sensors such as a grip limit sensor that executes a detection in a traveling state of the vehicle 301, a left and right wheel differential rotation sensor that detects a differential rotation between left and right wheels, a drive force sensor that detects a magnitude of a drive force input from the drive source 303, a lateral inclination sensor that detects a lateral inclination state of the vehicle 301, a lateral acceleration sensor that detects a lateral acceleration of the vehicle 301, a vehicle speed sensor, and a driver sensor that detects an operation state selected by a driver.

The vehicle speed may be directly detected by the vehicle speed sensor, or may be calculated based on a rotation detected by rotation sensors provided on the front, rear, left, and right wheels.

In addition to the various sensors described above, the differential lock ECU 5 and the main ECU 7 receive information from various sensors such as an acceleration and deceleration feel sensor including an accelerator angle sensor or the like, a steering angle sensor, an engine control command for controlling starting and stopping of an engine serving as the drive source 303, controlling a fuel and air supply amount, and the like, a brake sensor, a throttle opening sensor, a front and rear wheel differential rotation sensor, a yaw moment sensor, an oil temperature sensor, an outside air temperature sensor, and the like.

The differential lock ECU 5 and the main ECU 7 that can receive information from various sensors can select, calculate, or compare necessary sensor information with a record chart, and output control information to each mechanism mounted in the vehicle 301 to control an operation of each mechanism.

Information from various sensors or the like can be transmitted and received between the differential lock ECU 5 and the main ECU 7. The differential lock ECU 5 can receive various kinds of sensor information required for a manual mode or an automatic mode related to ON and OFF of locking of the differential lock device 211. The differential lock ECU 5 is electrically connected with the electromagnet 257 of the actuator 241 of the differential lock device 211. The differential lock ECU 5 controls energization to the electromagnet 257 based on the received information.

The drive control apparatus 1 has a manual mode in which an operator such as a driver can freely select to switch between ON and OFF of locking of the differential lock device 211, and an automatic mode in which the differential lock ECU 5 automatically select to switch between ON and OFF of locking of the differential lock device 211.

Since the differential device 201 includes the self-controlled differential limiting device 213, the differential limiting device 213 can limit the differential of the differential mechanism 215 under the self-control of the differential limiting device 213 (shown as LSD in FIG. 4) when locking of the differential lock device 211 is turned off (in an unlocked state).

For example, an operator such as a driver sets a mode switch (mode SW in FIG. 3) provided inside the vehicle to a manual mode. In the manual mode, by switching ON and OFF of the mode switch, the operator can freely select to turn on locking of the differential lock device 211 (locked state: DIFF.LOCK in FIG. 4) or to turn off locking of the differential lock device 211 (unlocked state: LSD in FIG. 4).

Figure 3:
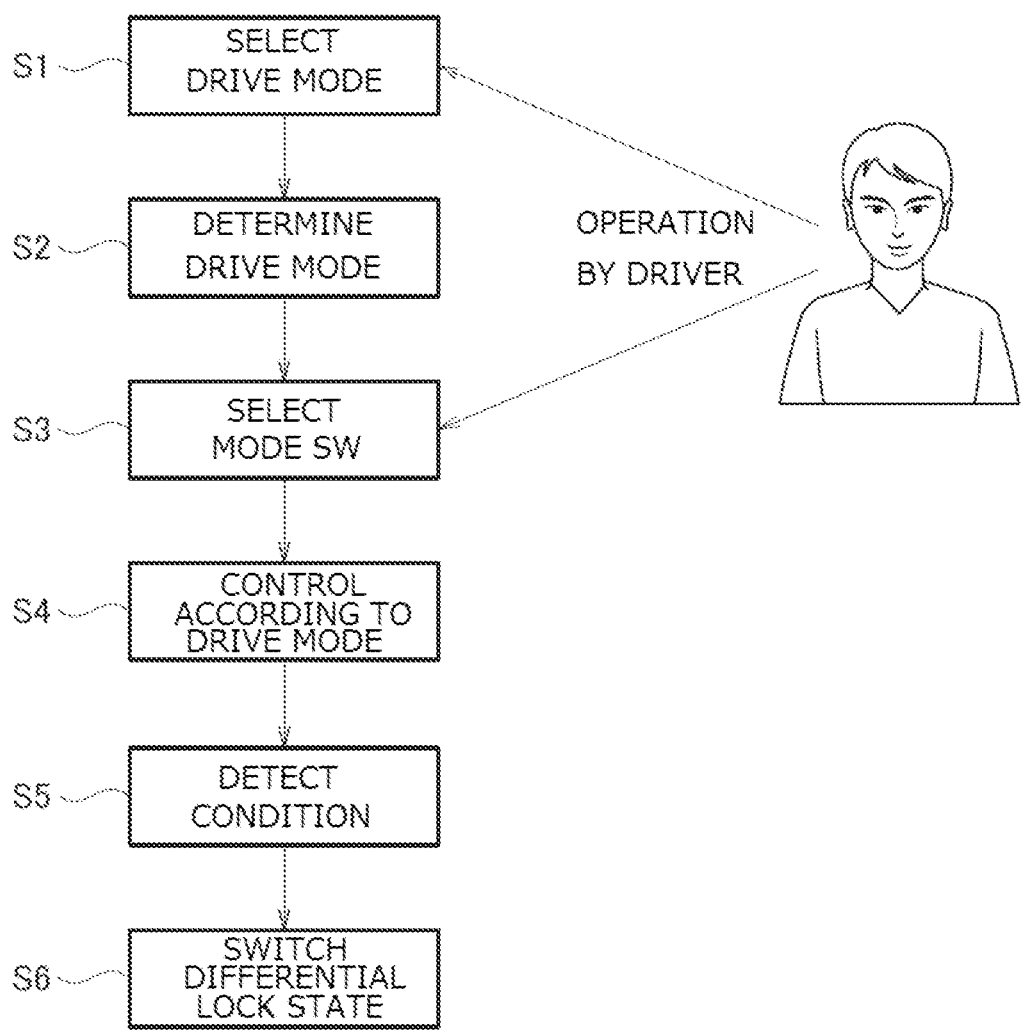
FIG. 3 is a diagram showing a control flow of the drive control apparatus according to the first embodiment.
Figure 4:
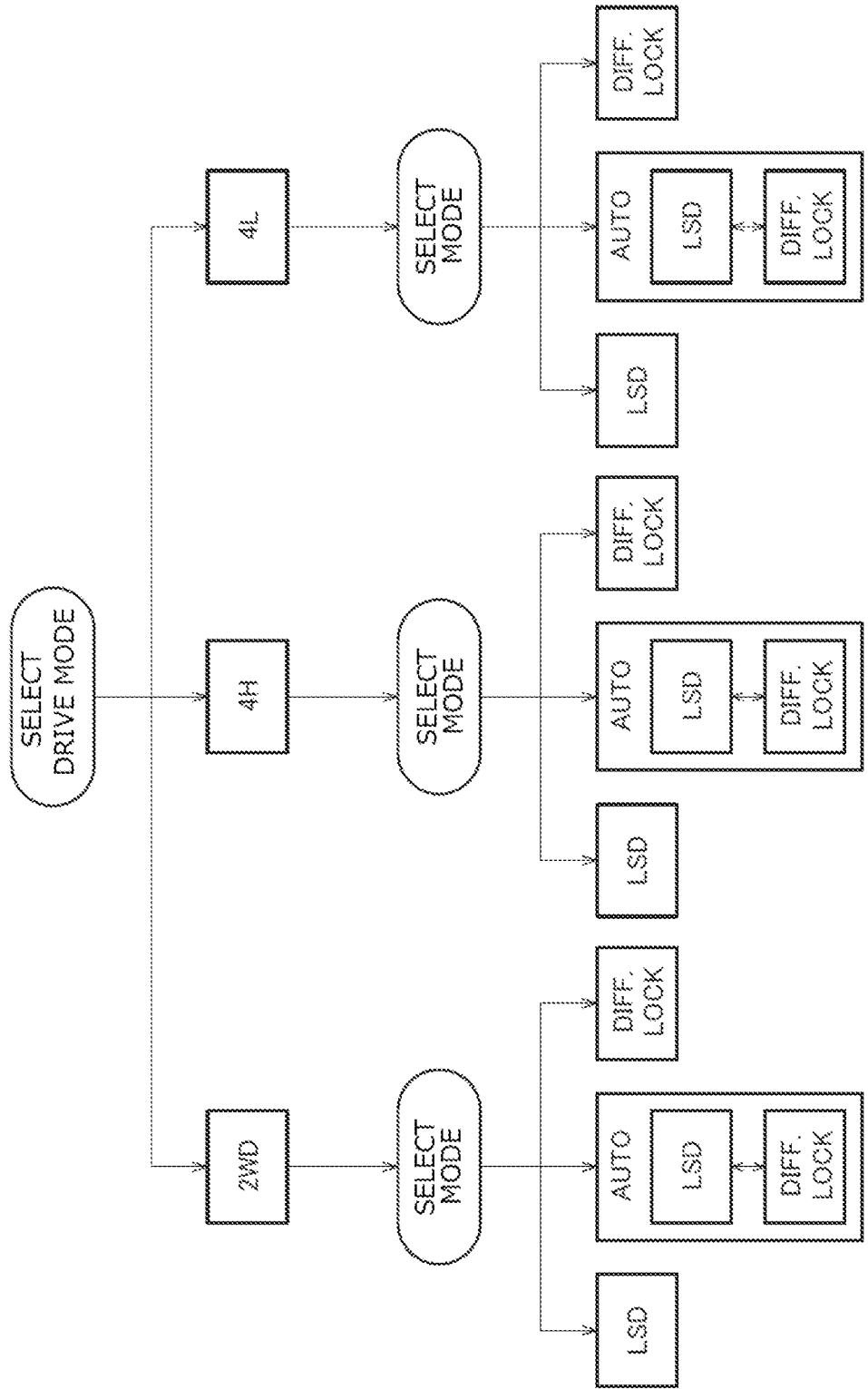
FIG. 4 is a diagram showing a control method of the drive control apparatus according to the first embodiment.

For example, an operator such as a driver sets a mode switch (mode SW in FIG. 3) provided inside the vehicle to an automatic mode (AUTO in FIG. 4). In the automatic mode, the differential lock ECU 5 automatically switches to turn on locking of the differential lock device 211 (locked state: DIFF.LOCK in FIG. 4) or turn off locking of the differential lock device 211 (unlocked state: LSD in FIG. 4).

A drive mode of the vehicle 301 includes a two wheel drive state (2WD in FIG. 4) in which rear wheels are driven and a four wheel drive state in which front and rear wheels are driven. A drive mode in the four wheel drive state includes a first four wheel drive state (4H in FIG. 4) in which a drive torque is equal to or less than a predetermined torque when a vehicle speed is equal to or higher than a predetermined speed, and a second four wheel drive state (4L in FIG. 4) in which a drive torque is equal to or larger than a predetermined torque when a vehicle speed is equal to or lower than a predetermined speed.

An operator such as a driver may freely select these drive modes by switching, for example, a selection switch provided inside the vehicle. Alternatively, the differential lock ECU 5 may automatically switch these drive modes according to a traveling state of the vehicle.

In the drive control apparatus in the related art, for example, only in a drive mode of the second four wheel drive state (4L in FIG. 4) in which the drive torque is equal to or larger than a predetermined torque when a vehicle speed is equal to or lower than a predetermined speed, locking of the differential lock device 211 is turned on or turned off in an automatic mode.

The differential lock ECU 5 of the drive control apparatus 1 according to the present embodiment has first and second switching timings that are different switching timings for the automatic mode between the two wheel drive state (2WD in FIG. 4) in which at least one of the front and rear wheels of the vehicle 301 (here, the rear wheels) is driven and the first four wheel drive state (2H in FIG. 4) in which both the front and rear wheels of the vehicle 301 are driven.

The differential lock ECU 5 has a third switching timing corresponding to the second four wheel drive state (4L in FIG. 4) in which a drive torque can be increased.

Since a threshold of an input torque to the differential device 201 is set to a threshold in a drive mode of the second four wheel drive state (4L in FIG. 4), locking of the differential lock device 211 is switched to ON in an early stage from a stage in which the input torque is small in the automatic mode of the differential lock ECU 5. Thus, the differential lock device 211 can be locked at a fairly early stage such as a stage where no slip occurs in one of the wheels, the drive torque can be transmitted to the wheels with good response, and running performance can be improved.

On the other hand, since a threshold of an input torque to the differential device 201 in the first four wheel drive state (4H in FIG. 4) is set to be higher than the threshold in the second four wheel drive state in which a vehicle speed is lower than a vehicle speed in a drive mode of the first four wheel drive state, for example, a certain amount of slip is allowed on one of the wheels when the vehicle travels. Therefore, steering operability, that is, turning performance is improved.

A threshold in the two wheel drive state (2WD in FIG. 4) is set to be slightly higher than or substantially equal to the input torque to the differential device 201 in the first four wheel drive state, and a predetermined threshold is added to a rotation difference between left and right wheels, so that steering stability during normal traveling can be improved, and running performance during an emergency can be improved.

The automatic mode of the differential lock ECU 5 includes, for example, the first, second, and third switching timings set such that thresholds of input torques to the differential device 201 are different, so that when an input torque to the differential device 201 exceeds a threshold in a drive mode, locking of the differential lock device 211 is turned on at an accurate timing corresponding to a drive mode, and the differential of the differential mechanism 215 is brought into a locked state.

Therefore, ON and OFF of locking of the differential lock device 211 can be accurately controlled corresponding to a drive mode of the vehicle 301, and steering stability of the vehicle 301 in the drive modes can be improved, and running performance of the vehicle 301 can be improved.

The switching timings in the two wheel drive state and the first and the second four wheel drive states may be determined by directly using or combining various kinds of sensor information directly input to the differential lock ECU or specified sensor information quoted from various kinds of sensor information input to the main ECU, for example, by using a rotation difference between left and right wheels serving as a threshold.

When the differential device 201 includes the differential limiting device 213 that limits the differential of the differential mechanism 215 under the self-control of the differential limiting device 213 and locking of the differential lock device 211 is turned off, the differential of the differential mechanism 215 is limited by the differential limiting device 213.

The differential limiting device 213 has a condition capable of limiting the differential of the differential mechanism 215, and the differential limiting device 213 can limit the differential of the differential mechanism 215 until a value exceeding the condition is input depending on a traveling state of the vehicle 301.

Therefore, in the automatic mode, the differential lock ECU 5 adjusts the switching timing of ON and OFF of locking of the differential lock device 211 in accordance with a threshold of the differential limiting device 213.

The threshold of the differential limiting device 213 is determined by, for example, an input of at least one of a grip limit detected in a traveling state of the vehicle 301, a magnitude of a drive force input from the drive source 303, a lateral inclination state of the vehicle 301, and a lateral acceleration of the vehicle 301, in addition to the above-described differential rotation of the left and right wheels that is input to the differential lock ECU 5.

In the automatic mode of the differential lock ECU 5, when any value exceeding the threshold of the differential limiting device 213 is input under the above-described conditions, it is determined that the differential limiting device 213 cannot limit the differential of the differential mechanism 215, locking of the differential lock device 211 is turned on, and the differential of the differential mechanism 215 is brought into a locked state.

In this manner, the switching timing of ON and OFF of locking of the differential lock device 211 is set in accordance with the threshold of the differential limiting device 213, so that a differential limiting force of the differential limiting device 213 can be maximized, the differential lock device 211 can be operated at an accurate timing, the steering stability of the vehicle 301 can be improved, and the running performance of the vehicle 301 can be improved.

In the differential limiting device 213, since a traveling state of the vehicle 301 is different in each driving mode of the vehicle 301, the threshold capable of limiting the differential of the differential mechanism 215 is different in each drive mode.

Therefore, in the automatic mode of the differential lock ECU 5, the first, second, and third switching timings are set in accordance with different thresholds at which limiting characteristics of the differential limiting device 213 can be maximized in each drive mode.

Therefore, in each drive mode of the vehicle 301, a differential limiting force of the differential limiting device 213 can be maximized, the differential lock device 211 can be operated at an accurate timing, and the running performance of the vehicle 301 can be improved in each drive mode.

In this manner, when the differential device 201 includes the differential limiting device 213, the differential lock ECU 5 can adjust the first, second, and third switching timings in accordance with the differential limiting device 213 in the automatic mode.

A control of the drive control apparatus 1 will be described with reference to FIGS. 3 and 4.

As shown in FIGS. 3 and 4, the drive control apparatus 1 first confirms which drive mode among the drive modes of the vehicle 301 is selected by an operator such as a driver using the selection switch (S1), and determines the selected drive mode of the vehicle 301 (S2).

As for the drive modes of the vehicle 301, the differential lock ECU 5 may automatically select a drive mode in accordance with a traveling state such as a road surface or weather for the vehicle 301. In this case, the differential lock ECU 5 determines the automatically selected drive mode of the vehicle 301.

Next, the drive control apparatus 1 checks whether the operator such as a driver selects the manual mode or the automatic mode using the mode switch (S3).

When the manual mode is not set in the vehicle, the step S3 can be omitted, and the ON and OFF control of locking of the differential lock device 211 is executed at a predetermined switching timing set after step S4 in accordance with the drive mode selected in step S1.

Next, the drive control apparatus 1 controls the ON and OFF operation of locking of the differential lock device 211 in accordance with the determined drive mode and the selected mode (S4).

At this time, when the selected mode is the manual mode, in each drive mode, the drive control apparatus 1 turns on locking of the differential lock device 211 (locked state: DIFF.LOCK in FIG. 4) or turns off locking of the differential lock device 211 (unlocked state: LSD in FIG. 4) in accordance with an operation of a mode switch operated by an operation such as a driver.

On the other hand, when the selected mode is the automatic mode (AUTO in FIG. 4) in the drive control apparatus 1, the differential lock ECU 5 directly acquires a condition of the switching timing of turning on or turning off locking of the differential lock device 211 or acquires the condition from the main ECU 7 in accordance with the determined drive mode (S5).

In the automatic mode (AUTO in FIG. 4) in each drive mode (2WD, 4H, 4L in FIG. 4), the drive control apparatus 1 automatically switches to turn on locking of the differential lock device 211 (locked state: DIFF.LOCK in FIG. 4) or turn off locking of the differential lock device 211 (unlocked state: LSD in FIG. 4) based on the condition directly acquired by the differential lock ECU 5 or acquired by the differential lock ECU 5 from the main ECU 7 (S6).

In the drive control apparatus 1, the control device 3 includes the differential lock ECU 5 having the first and the second switching timings that are different switching timings for the automatic mode between the two wheel drive state in which at least one of the front wheels and rear wheels of the vehicle 301 is driven and the four wheel drive state in which both the front and rear wheels of the vehicle 301 are driven.

Therefore, in the automatic mode of the control device 3, the differential lock ECU 5 can automatically switch different timings of turning on and turning off locking of the differential lock device 211 between the two wheel drive state and the four wheel drive state of the vehicle 301.

In this manner, switching timings of turning on and turning off locking of differential lock device 211 are different in accordance with a drive mode of the vehicle 301, so that steering stability of the vehicle 301 in different drive modes can be improved and running performance of the vehicle 301 can be improved.

Therefore, in the drive control apparatus 1, since the differential lock ECU 5 has the first and the second switching timings that are different switching timings for the automatic mode between the two wheel drive state and the four wheel drive state of the vehicle 301, an operation of the differential lock device can be accurately controlled in the automatic mode in accordance with a drive mode of the vehicle 301 such as the four wheel drive state and the two wheel drive state.

The four wheel drive state in which both the front and rear wheels of the vehicle 301 are driven can be switched to the second four wheel drive state in which a drive torque can be further increased, and the differential lock ECU 5 has a third switching timing corresponding to the second four wheel drive state.

Therefore, an operation of the differential lock device 211 can be controlled at an accurate switching timing in the automatic mode in accordance with various drive modes of the vehicle 301.

The differential device 201 includes the differential limiting device 213 that can limit the differential under the self-control of the differential limiting device 213, and the differential lock ECU 5 can further adjust the switching timing when the differential device 201 includes the differential limiting device 213.

Therefore, it is possible to control an operation of the differential lock device 211 at an accurate switching timing while efficiently exhibiting a differential limiting function of the differential limiting device 213.

Second Embodiment

A second embodiment will be described with reference to FIG. 5.

In a drive control apparatus 101 according to the second embodiment, the differential device 201 can control a differential rotation by a brake 277 that can brake a drive rotation of one or both of the pair of side gears 207 and 209.

The differential lock ECU 5 has first, second, and third switching timings for controlling an operation of the brake 277.

The same components as those in the first embodiment are denoted by the same reference numerals, configurations and functions of the same components refer to those in the first embodiment and are omitted in description. The same effects as those in the first embodiment can be obtained.

Figure 5:
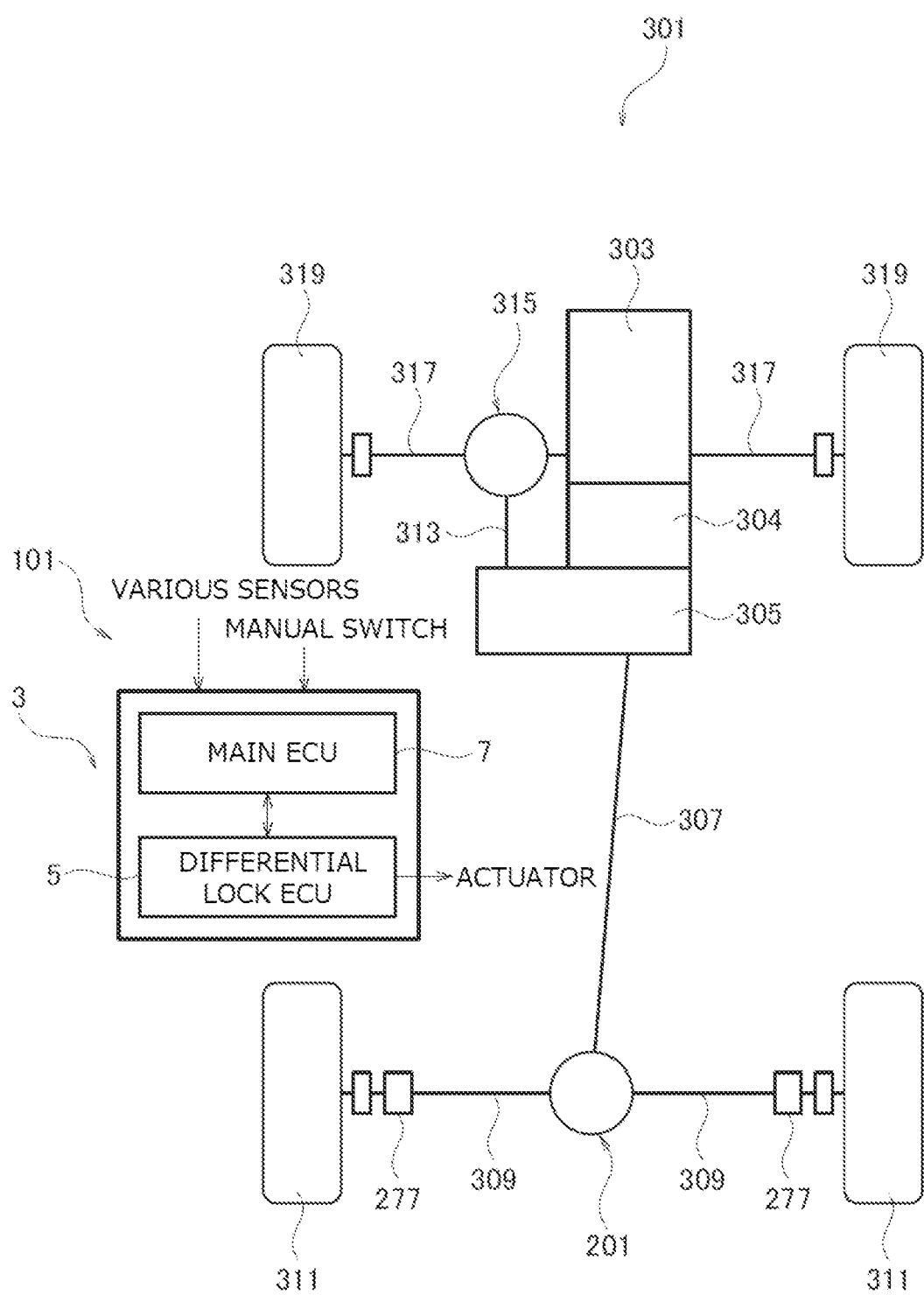
FIG. 5 is a schematic diagram showing an example of a power system of a vehicle to which a drive control apparatus according to a second embodiment.

As shown in FIG. 5, the brakes 277 are respectively provided between the rear wheels 311 and 311 and the rear axles 309 and 309 coupled to the pair of side gears 207, 209 (see FIG. 2).

Actuators (not shown) of the brakes 277 and 277 are electrically connected to the differential lock ECU 5 of the drive control apparatus 101, and the brakes 277 and 277 are operated under the control of the differential lock ECU 5 to brake a rotation from the pair of left and right wheels 311 and 311, that is, the pair of left and right side gears 207 and 209, so that the differential of the differential mechanism 215 (see FIG. 2) can be brought into a pseudo-locked state.

At a timing when the differential mechanism 215 is brought into a locked state, at least one brake 277 of the brakes 277 and 277 are operated to bring the differential mechanism 215 into the locked state.

Since the brake 277 can bring the differential of the differential mechanism 215 into a locked state, the differential lock device of the differential device 201 according to the present embodiment does not include the clutch member 237.

That is, in the present embodiment, the brake 277 functions as a differential lock device that brings the differential of the differential mechanism 215 into a pseudo-locked state or an unlocked state.

In the manual mode, the brake 277 brings the differential mechanism 215 into a pseudo-locked state or brings the differential mechanism 215 to an unlocked state in accordance with an operation of a mode switch by an operator such as a driver.

On the other hand, in the automatic mode, the differential lock ECU 5 controls the brake 277 to automatically switch between a pseudo-locked state of the differential mechanism 215 and an unlocked state of the differential mechanism 215 in accordance with a condition input directly to the differential lock ECU or input to the differential lock ECU via the main ECU 7.

In the drive control apparatus 101 applied to the differential device 201 provided with the brake 277 that functions as a differential lock device as described above, the differential lock ECU 5 has the first, the second, and the third switching timings in a similar to those of the differential lock device 211, serving as switching timings for switching ON and OFF of the brake 277 in accordance with a drive mode of the vehicle 301 in the automatic mode.

As described above, the differential lock ECU 5 has the first, the second, and the third switching timings for controlling an operation of the brake 277 in accordance with a drive mode of the vehicle 301, so that the operation of the brake 277 can be accurately controlled in accordance with each drive mode of the vehicle 301, and the steering stability of the vehicle 301 in each drive mode can be improved, and the running performance of the vehicle 301 can be improved.

In the drive control apparatus 101, since the differential lock ECU 5 has the first, the second, and the third switching timings for controlling an operation of the brake 277, the operation of the brake 277 can be controlled in the automatic mode in accordance with a drive mode of the vehicle 301.

The differential lock ECU 5 is individually set in the present embodiment in a similar manner to the first embodiment. Alternatively, the control device 3 may include an ECU that controls a brake system such as a brake ECU and a traction control ECU without including the differential lock ECU.

In the drive control apparatus according to the present embodiment, the differential device includes the differential limiting device, and a switching timing of the differential lock device is adjusted in accordance with the differential limiting device. The present invention is not limited thereto. When the differential device does not include the differential limiting device, a switching timing of the differential lock device may be different depending on a drive mode.

In addition, the differential lock device may be provided in each of the front and rear differential devices 315 and 201, and the drive control apparatus may be configured using both or any one of the differential devices as a component.

What is claimed is:

1. A drive control apparatus in a vehicle,
wherein the vehicle includes at least a pair of front wheels and a pair of rear wheels,
wherein a differential device is disposed at least between one of the pair of front wheels and the pair of rear wheels,
wherein a drive source is configured to drive the one of the pair of front wheels and the pair of rear wheels through the differential device,
wherein the differential device includes:
   an input member that is rotatably disposed and to which a drive force is input;
   a differential member that is rotatably supported on the input member and capable of revolving by a rotation of the input member;
   a pair of output members that respectively engage with the differential member, the pair of output members being differentially rotatable with respect to each other, and the pair of output members being configured to respectively output the drive force; and
   a differential lock device configured to lock a differential rotation of the pair of output members,
the drive control apparatus comprising:
a control device configured to control a driving of the vehicle,
wherein the control device includes an automatic mode in which a locking of the differential lock device is capable of being automatically switched ON and OFF,
wherein the control device includes a control unit having a first switching timing and a second switching timing in which switching timings of the automatic mode are different from each other between a two wheel drive state and a four wheel drive state, and
wherein one of the front wheels and rear wheels is driven in the two wheel drive state, and both of the front wheels and rear wheels are driven in the four wheel drive state.

2. The drive control apparatus according to claim 1,
wherein the four wheel drive state is capable of being switched to a second four wheel drive state in which a drive torque is further increased, and
wherein the control unit has a third switching timing corresponding to the second four wheel drive state.

3. The drive control apparatus according to claim 1,
wherein the differential device includes a differential limiting device configured to limit the differential rotation of the pair of output members under a self-control of the differential limiting device, and
wherein the control unit has a switching timing when the differential device includes the differential limiting device.

4. A drive control apparatus in a vehicle,
wherein the vehicle includes at least a pair of front wheels and a pair of rear wheels,
wherein a differential device is disposed at least between one of the pair of front wheels and the pair of rear wheels,
wherein a drive source is configured to drive the one of the pair of front wheels and the pair of rear wheels through the differential device,
wherein the differential device includes:
   an input member that is rotatably disposed and to which a drive force is input;
   a differential member that is rotatably supported on the input member and capable of revolving by a rotation of the input member; and
   a pair of output members that respectively engage with the differential member, the pair of output members being differentially rotatable with respect to each other, and the pair of output members being configured to respectively output the drive force,
the drive control apparatus comprising:
a control device configured to control a differential rotation between the pair of output members by a brake configured to brake a drive rotation of one or both of the pair of output members,
wherein the control device includes a control unit having a first switching timing and a second switching timing in which switching timings of braking of the brake are different from each other between a two wheel drive state and a four wheel drive state, and
wherein one of the front wheels and rear wheels is driven in the two wheel drive state, and both of the front wheels and rear wheels are driven in the four wheel drive state.

5. A drive control apparatus comprising:
a circuitry configured to operate a differential lock device of a differential device,
wherein the differential device is disposed between one of a pair of front wheels and a pair of rear wheels of the vehicle and configured to transmit a driving force from a drive source to the one of the pair of front wheels and the pair of rear wheels,
wherein the differential device includes:
   an input member that is rotatably disposed and to which the drive force is input;
   a differential member that is rotatably supported on the input member and capable of revolving by a rotation of the input member;
   a pair of output members that respectively engage with the differential member, the pair of output members being differentially rotatable with respect to each other, and the pair of output members being configured to respectively output the drive force; and
   the differential lock device configured to lock a differential rotation of the pair of output members,
wherein the one of the pair of front wheels and the pair of rear wheels is driven in a two wheel drive state, and both of the pair of front wheels and the pair of rear wheels are driven in a four wheel drive state;
wherein the circuitry is configured to operate the differential lock device so as to lock a differential rotation between a right wheel and a left wheel of the one of the pair of front wheels and the pair of rear wheels to which the differential device is disposed; and
wherein timings for locking the differential rotation between the right wheel and the left wheel by the differential lock device are different between the two wheel drive state and the four wheel drive state.

6. The drive control apparatus according to claim 5, wherein the differential lock device includes a clutch member and an interrupting portion.

7. The drive control apparatus according to claim 5, wherein the differential lock device includes a brake configured to brake a rotation of one of the pair of the output members or rotations of both of the pair of the output members.

8. The drive control apparatus according to claim 5, wherein the timings for locking the differential rotation between the right wheel and the left wheel by the differential lock device are thresholds.

* * * * *